US012494560B1

(12) United States Patent
Tsironis

(10) Patent No.: US 12,494,560 B1
(45) Date of Patent: Dec. 9, 2025

(54) TRIPLE BAND LOAD PULL TUNING PROBE SYSTEM WITH SINGLE CONTROL

(71) Applicant: Christos Tsironis, St-Laurent (CA)

(72) Inventor: Christos Tsironis, Kirkland (CA)

( * ) Notice: Subject to any disclaimer, the term of this patent is extended or adjusted under 35 U.S.C. 154(b) by 218 days.

(21) Appl. No.: 18/389,411

(22) Filed: Nov. 14, 2023

(51) Int. Cl.
*H01P 3/02* (2006.01)
*G01R 31/26* (2020.01)

(52) U.S. Cl.
CPC ............ *H01P 3/02* (2013.01); *G01R 31/2601* (2013.01)

(58) Field of Classification Search
CPC .............................. H01P 3/02; G01R 31/2601
See application file for complete search history.

(56) References Cited

U.S. PATENT DOCUMENTS

| | | |
|---|---|---|
| 6,980,064 B1 | 12/2005 | Boulerne |
| 8,098,112 B2 | 1/2012 | Simpson |
| 8,358,186 B1 | 1/2013 | Tsironis |
| 9,252,738 B1 | 2/2016 | Tsironis |
| 9,625,556 B1 | 4/2017 | Tsironis |
| 10,006,951 B1 * | 6/2018 | Tsironis ............ G01R 31/2608 |
| 11,428,771 B1 * | 8/2022 | Tsironis .................... H01P 5/04 |
| 11,621,468 B1 * | 4/2023 | Tsironis .................... H03H 7/38 |
| | | 333/33 |

OTHER PUBLICATIONS

"Load Pull" [online] Wikipedia, [Retrieved on Aug. 24, 2017]. Retrieved from Internet <URL: https://en.wikipedia.org/wiki/Load_pull>.
"Computer Controlled Microwave Tuner-CCMT", Product Note 41, Focus Microwaves Inc., Jan. 1998.

* cited by examiner

*Primary Examiner* — Eman A Alkafawi
*Assistant Examiner* — Courtney G Mcdonnough

(57) ABSTRACT

Triple band remotely configurable tuning probes for slide screw impedance tuners allow instantaneous larger frequency coverage beyond the capacity of existing tuning probes using the single horizontal and vertical axis mechanism of a prior art single probe, single band tuner. This is done by combining two types of tuning slug, a core slug and a saddle slug into a configurable tuning probe assembly mounted in the same mobile tuner carriage and controlled using the same single vertical axis mechanism with the help of two ridges on the core slug and a permanently mounted slug control fork. To avoid spurious resonance phenomena the tuning slugs are controlled, driven, and locked vertically sliding on each other, and guided appropriately allowing smooth, uninhibited vertical movement of the metallic bodies.

8 Claims, 12 Drawing Sheets

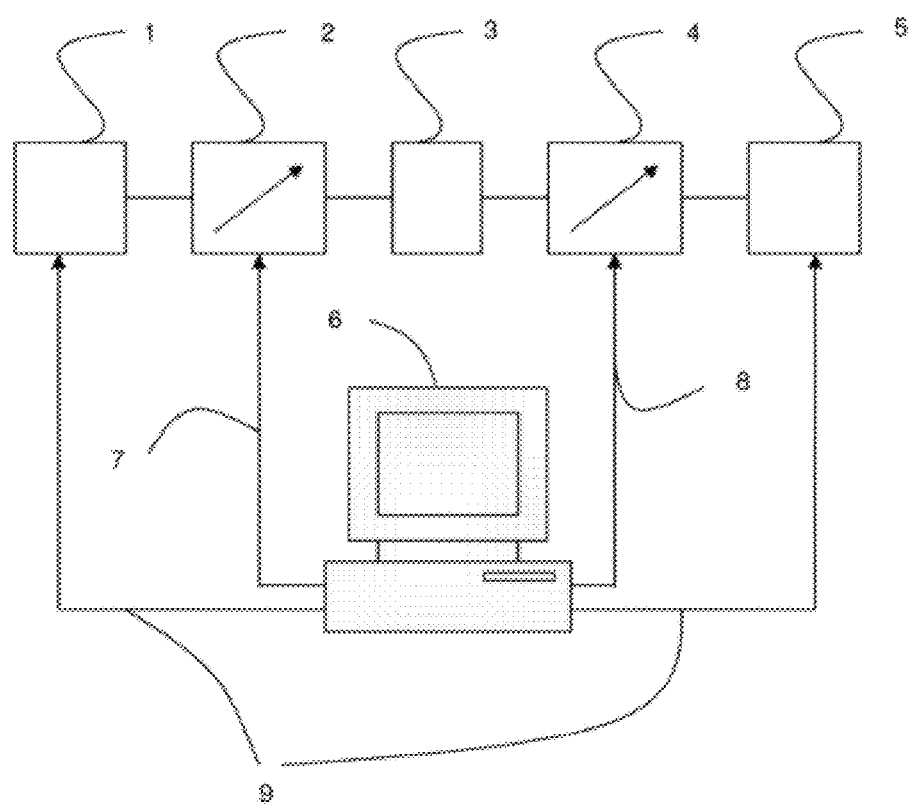
FIG. 1: Prior art

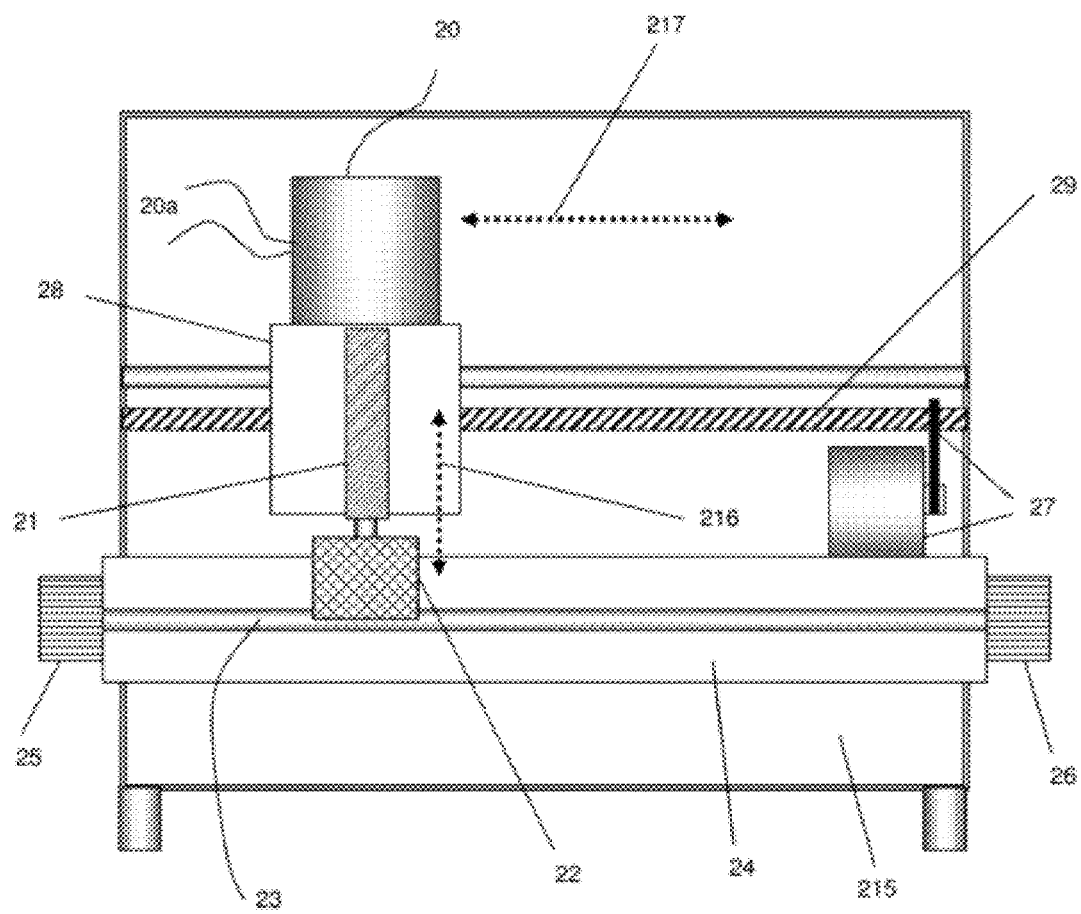
FIG. 2: Prior art

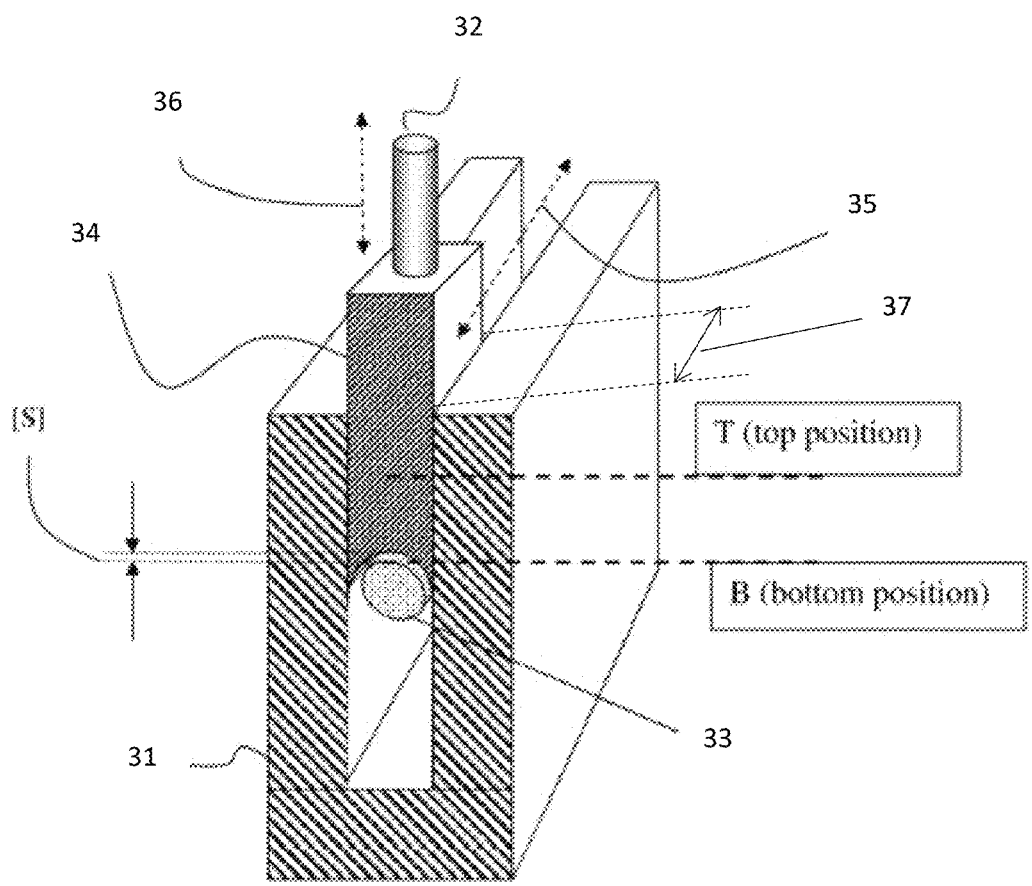
FIG. 3: Prior art

FIG. 4A
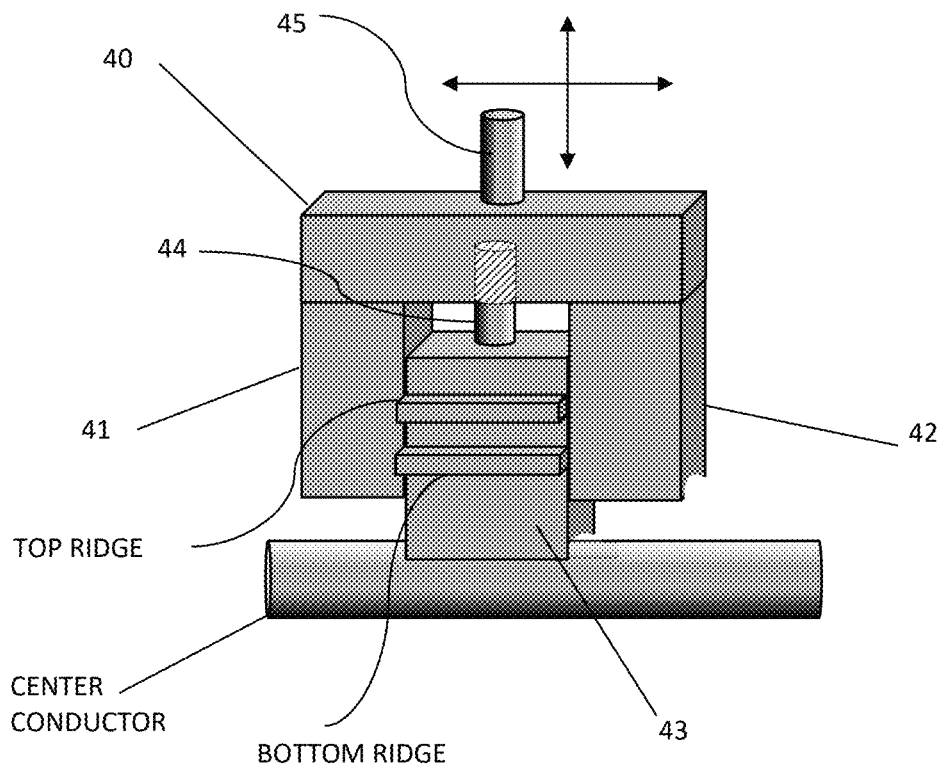
TOP RIDGE
CENTER CONDUCTOR
BOTTOM RIDGE
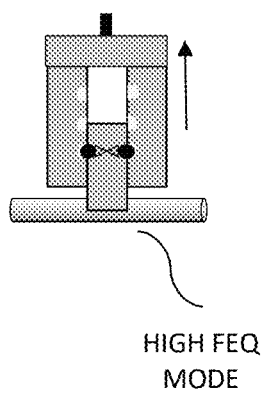
FIG. 4B
HIGH FEQ MODE
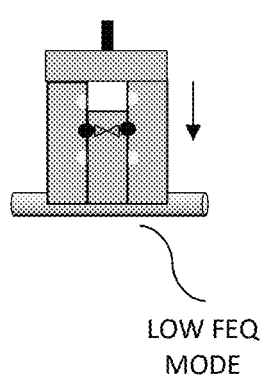
FIG. 4C
LOW FEQ MODE
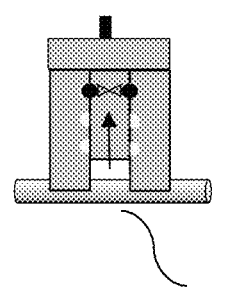
FIG. 4D
NOTCH MODE

TRIPLE BAND LOAD PULL TUNING PROBE SYSTEM WITH SINGLE CONTROL

PRIORITY CLAIM

Not Applicable

CROSS-REFERENCE TO RELATED ARTICLES

1. "Load Pull" [online] Wikipedia, [Retrieved on 2017 Aug. 24]. Retrieved from Internet <URL: https://en.wikipedia.org/wiki/Load_pull>.
2. "Computer Controlled Microwave Tuner, CCMT", Product Note 41, Focus Microwaves Inc. 1998, pages 2-4.
3. Tsironis, C. U.S. Pat. No. 8,358,186, "Impedance Tuners with Resonant Probes".
4. Boulerne, P. U.S. Pat. No. 6,980,064, "Slide-screw Tuner with Single Corrugated Slug".
5. Simpson, G. U.S. Pat. No. 8,098,112, "Impedance Tuner Systems and Probes".
6. Tsironis, C. U.S. Pat. No. 9,252,738, "Wideband Tuning Probes for Impedance Tuners and Method".
7. Tsironis, C. U.S. Pat. No. 9,625,556, "Method for Calibration and Tuning with Impedance Tuners".

BACKGROUND OF THE INVENTION

This invention relates to general microwave testing and in particular to testing of microwave transistors (DUT) in the high frequency (typically GHz range) domain using Load Pull (see ref. 1). Load Pull is a measurement method whereby the load impedance presented to the DUT at a given frequency is changed systematically and the DUT performance is registered, with the objective to find an optimum embedding (matching) network for obtaining the design objectives, which may be maximum gain, power, efficiency, linearity or else.

PRIOR ART

The popular load pull method for testing and characterizing medium to high-power microwave transistors (DUT, device under test) is called "load-pull" and uses appropriate test setups (FIG. 1 and ref. 1). Low noise transistors are tested using "source-pull". Load or source pull use impedance tuners 2, 4 (see ref. 2) and other test equipment, such as signal or noise sources 1, test fixtures housing the DUT 3, and power meters or low noise receivers 5, the whole controlled by a computer 6; the computer controls and communicates with the tuners 2, 4 and the other equipment 1, 5 using digital cables 7, 8, 9. The tuners are used in order to manipulate the microwave impedance conditions in a systematic and controlled manner, under which the DUT is tested (see ref. 1); impedance tuners allow determining the optimum impedance conditions of embedding networks for designing amplifiers and other microwave components for specific performance targets, such as noise parameters, gain, efficiency, intermodulation etc. Since the tuning probe 34 is capacitively coupled with the center conductor 33, increasing the reflection factor means increasing the maximum controllable capacitance by increasing the surface between the probes and the center conductor, which is possible, while avoiding a short circuit, only by increasing its horizontal length 37. Various types of resonant or combination tuning probes, including one or more slugs, have been reported before (see ref. 3, 4, 5 and 6); however, none includes configurable vertical movement of the individual slugs using a single vertical axis mechanism; in refs. 4 to 6 the objective has been to increase the tuning dynamic (GAMMA MAX) in certain frequency areas using statically configured multi slug tuning probes, and in ref. 3 the embodiment permits frequency selective tuning operation of single slug tuning probes.

BRIEF DESCRIPTION OF THE INVENTION

The objective of this invention is a tri-state three-frequency band remotely configurable tuning probe system for slide screw impedance tuners with a single vertical axis control mechanism, that allows larger continuous frequency coverage, beyond the capacity of each individual tuning probe, using only the single horizontal and vertical axis control mechanism of existing single probe, single frequency band tuners (see ref. 2). This is done by combining two tuning slug designs, a saddle slug and a core slug wherein the core slug slides up and down between the legs of the saddle slug which is the one directly controlled by the vertical axis mechanism. This creates a configurable tuning probe assembly, the slug components being mounted and controlled by the same mobile tuner carriage using the single vertical axis mechanism as shown in FIGS. 4A to 4D, which (a) allows larger maximum reflection factor (tuning range) in selected frequency range (FIG. 12), (b) can simply replace existing (prior art) tuning probes in existing tuners without additional remote-control and (c) can use all existing tuner calibration and data processing routines, all this effected with minimum cost and without requiring structural modification to existing tuners, additional internal remotely controlled mechanisms and/or external manual intervention. This is done by creating a tuning probe system, FIG. 4A with one core slug 43 sliding, guided vertically using pin 44, and locking vertically between the legs of a saddle slug 40, 42 and allowing three different operation modes: (1) a single high frequency core slug mode, FIG. 4B, (2) a double slug, low frequency mode, FIG. 4C, and (3) a notch slug selected frequency high Gamma mode, FIG. 4D.

DETAILED DESCRIPTION OF THE DRAWINGS

The invention and its mode of operation will be better understood from the following detailed description when read with the appended drawings in which:

FIG. 1 depicts prior art, a typical scalar (measuring amplitude only) load pull test system using pre-calibrated passive tuners.

FIG. 2 depicts prior art, a schematic front view of a passive slide screw load pull tuner.

FIG. 3 depicts prior art, a perspective view of a metallic reflective tuning probe (slug).

FIG. 4A through 4D depict the configurable tuning probe system comprising the saddler slug 40, 42, the core slug 43 and the various settings: FIG. 4A depicts a perspective view of the slug system with its components; FIG. 4B depicts the high frequency mode; FIG. 4C depicts the low frequency mode and FIG. 4D depicts the selective high Gamma (notch slug) mode.

Figure 5:
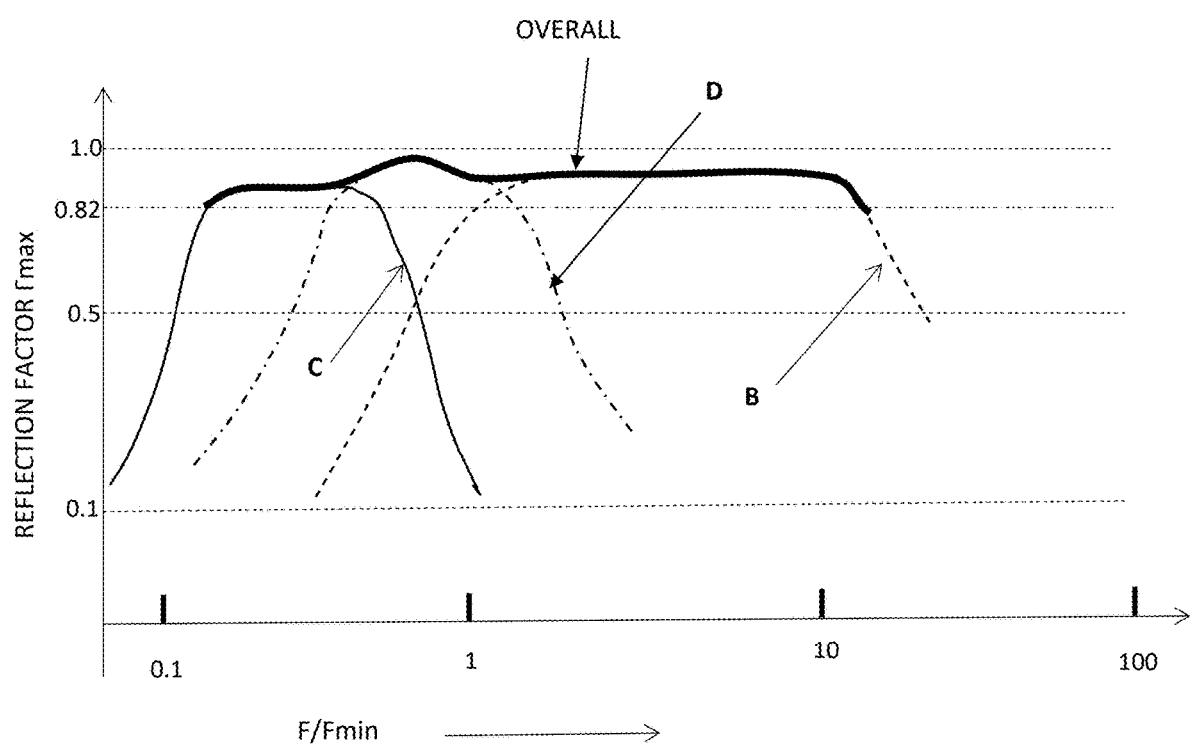

FIG. 5 depicts schematically the overlapping and typical maximum reflection factor as a function of frequency of the possible modes of the various tuning probe system of FIG. 4A.

Figures 6A, 6B:
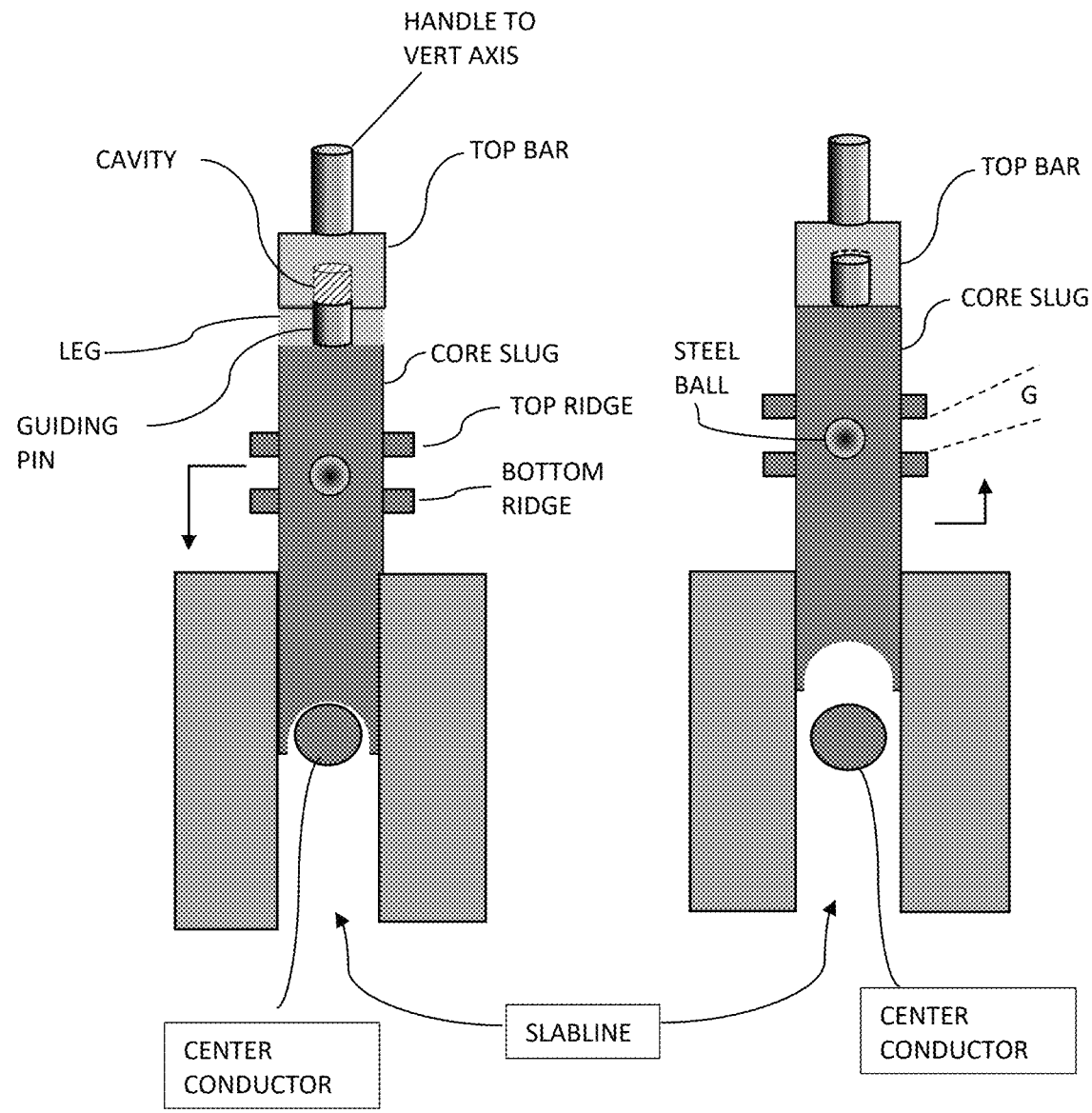

FIG. 6A through 6B depict the tuning probe system in minimum and maximum reflection states: FIG. 6A depicts the maximum reflection (Gamma) state of any slug (slug at closest proximity to center conductor); FIG. 6B depicts slug withdrawal creating a minimum reflection through line.

Figure 7:
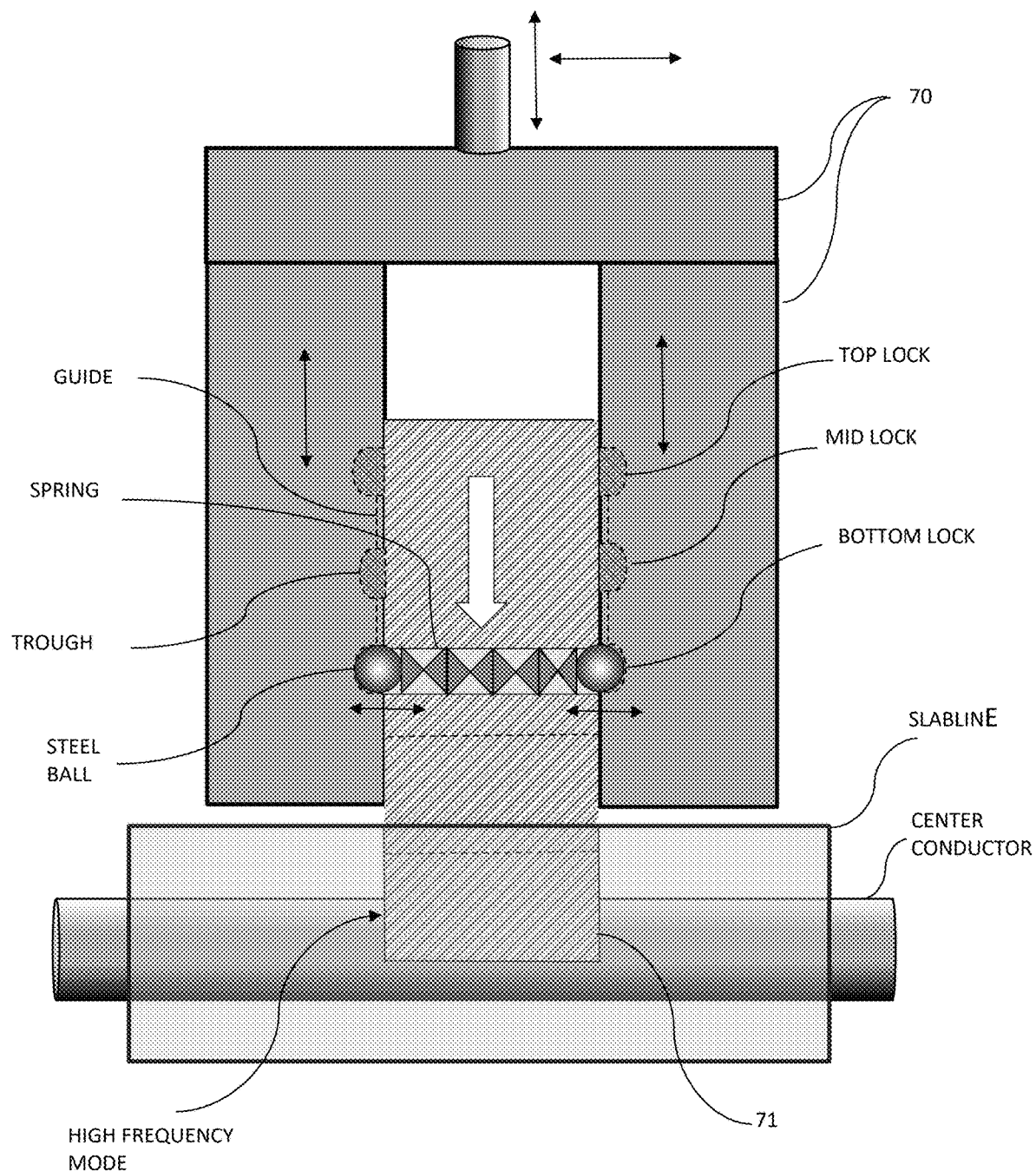

FIG. 7 depicts in more detail the core slug (high frequency) mode and the associated locking mechanism.

Figure 8:
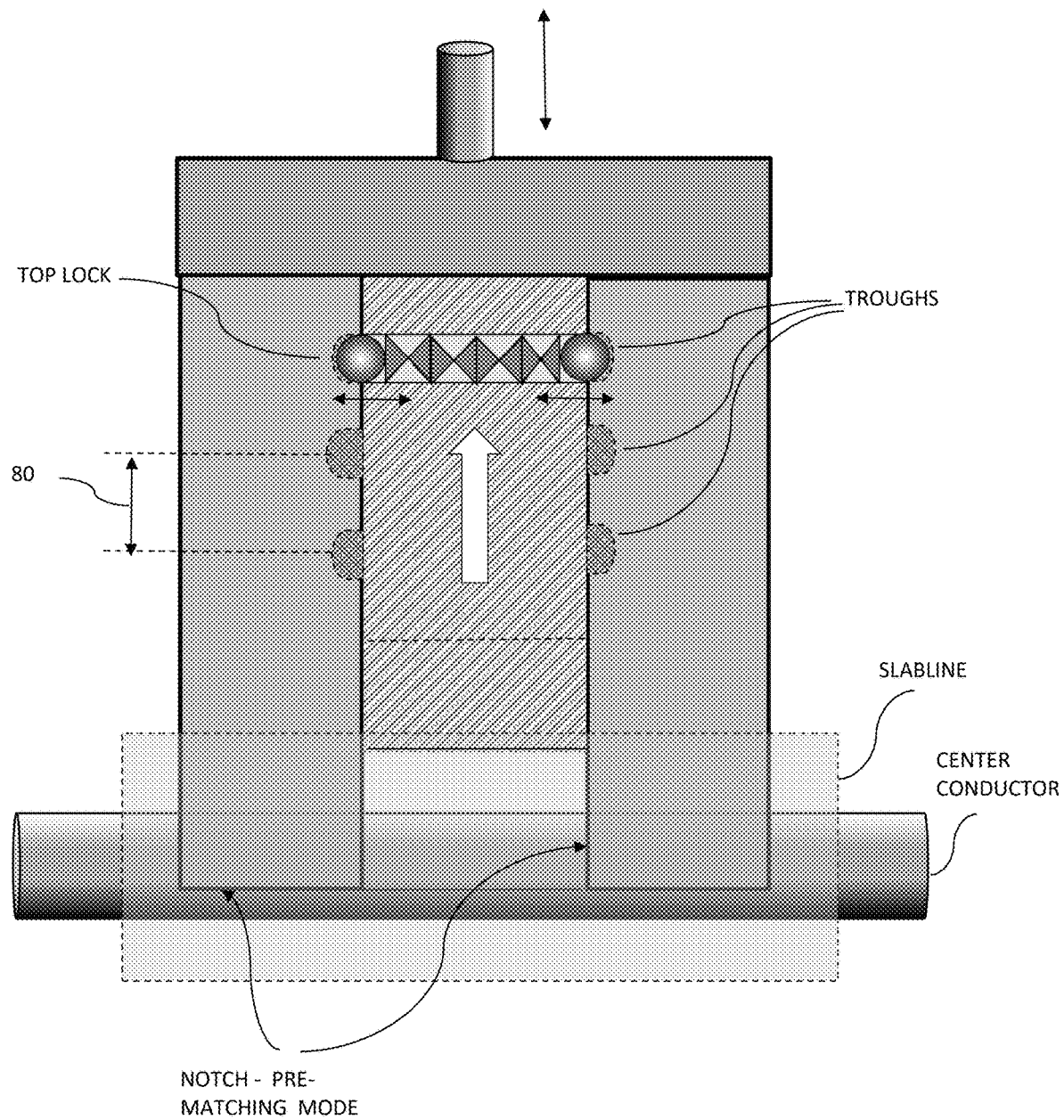

FIG. 8 depicts in more detail the notch slug (high Gamma) mode and the associated locking mechanism.

Figure 9:
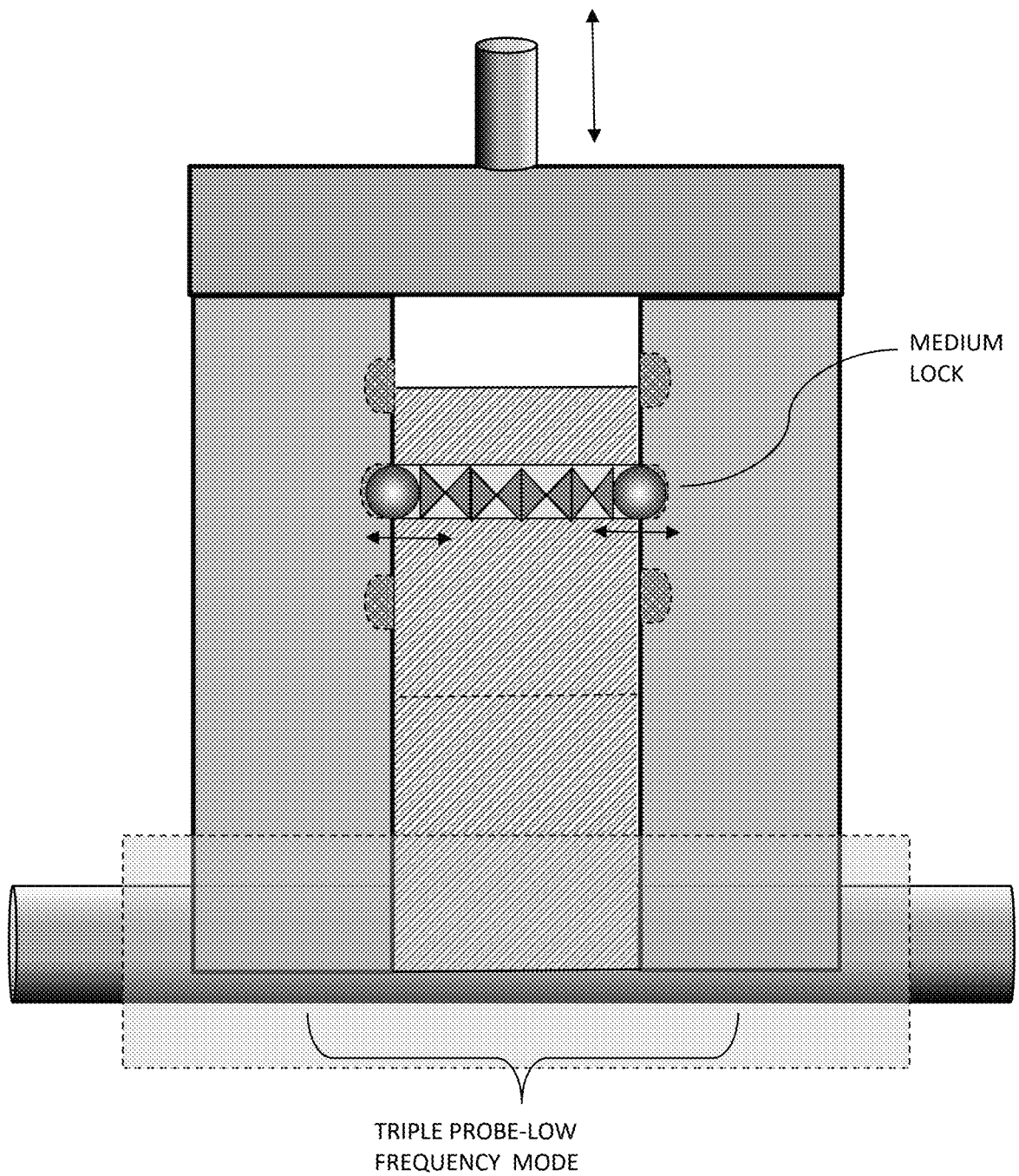

FIG. 9 depicts the low frequency (wide) slug mode and the associated locking.

Figure 10:
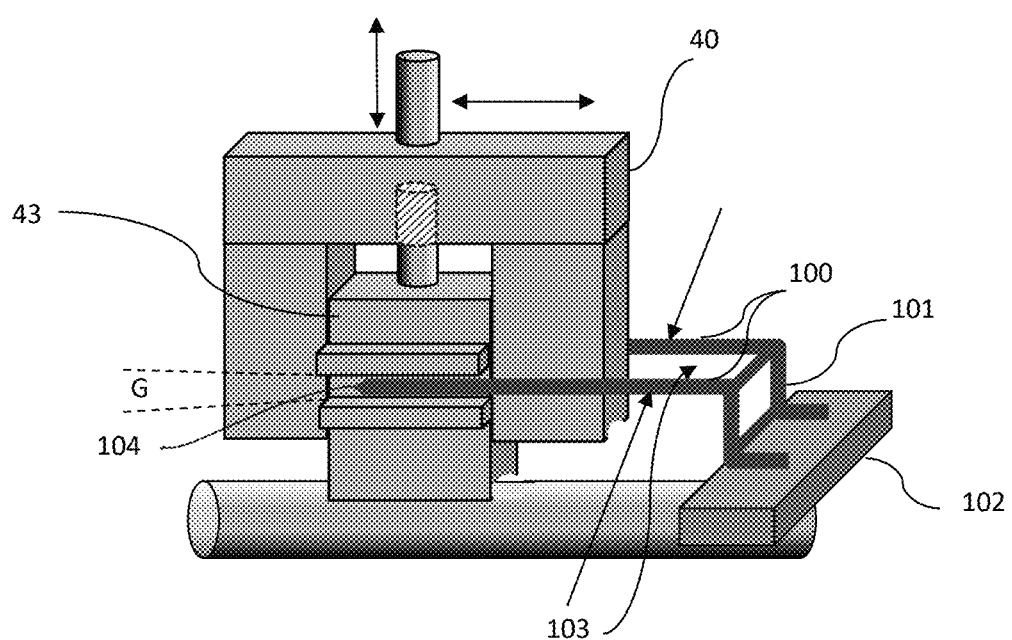

FIG. 10 depicts the combo slug system and the control fork inserted between the ridges of the core slug, ready to switch tuning modes by simply lifting or lowering the saddle slug.

Figure 11:
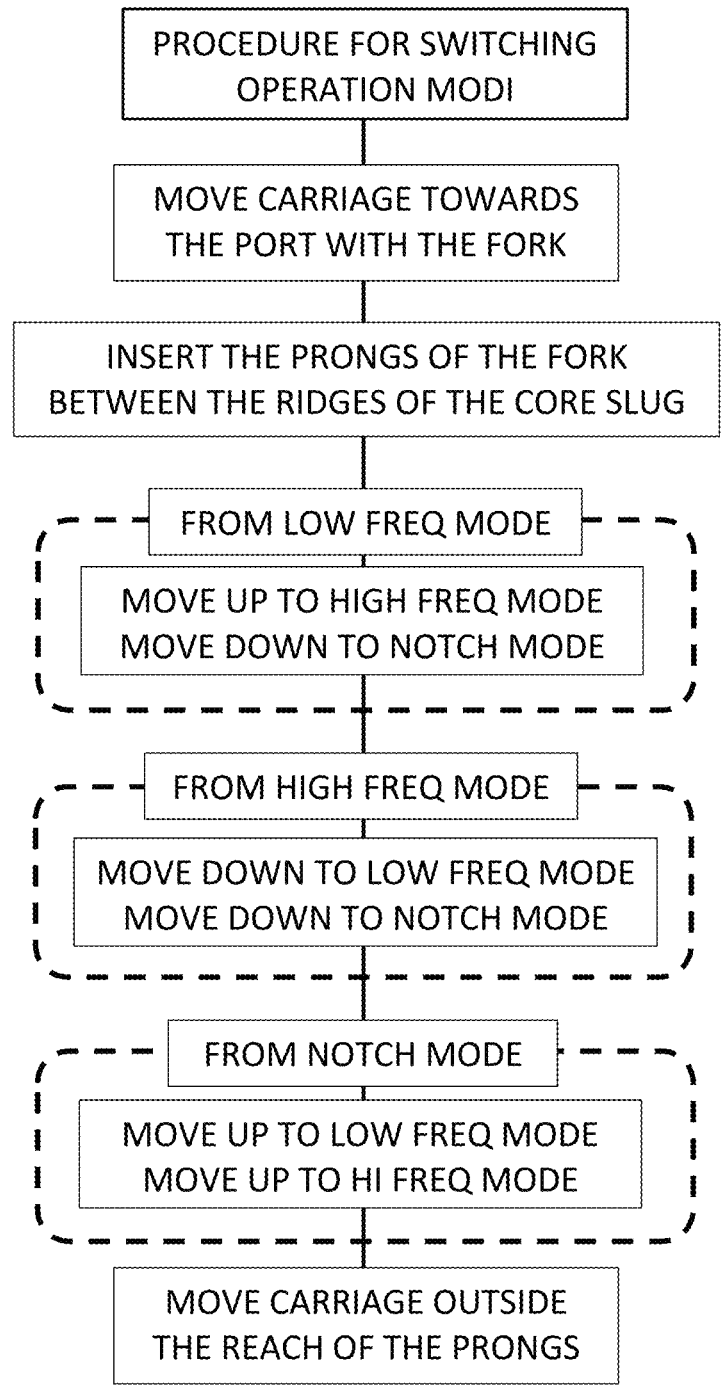

FIG. 11 depicts the flowchart of the procedures used to switch between tuning modes.

Figure 12:
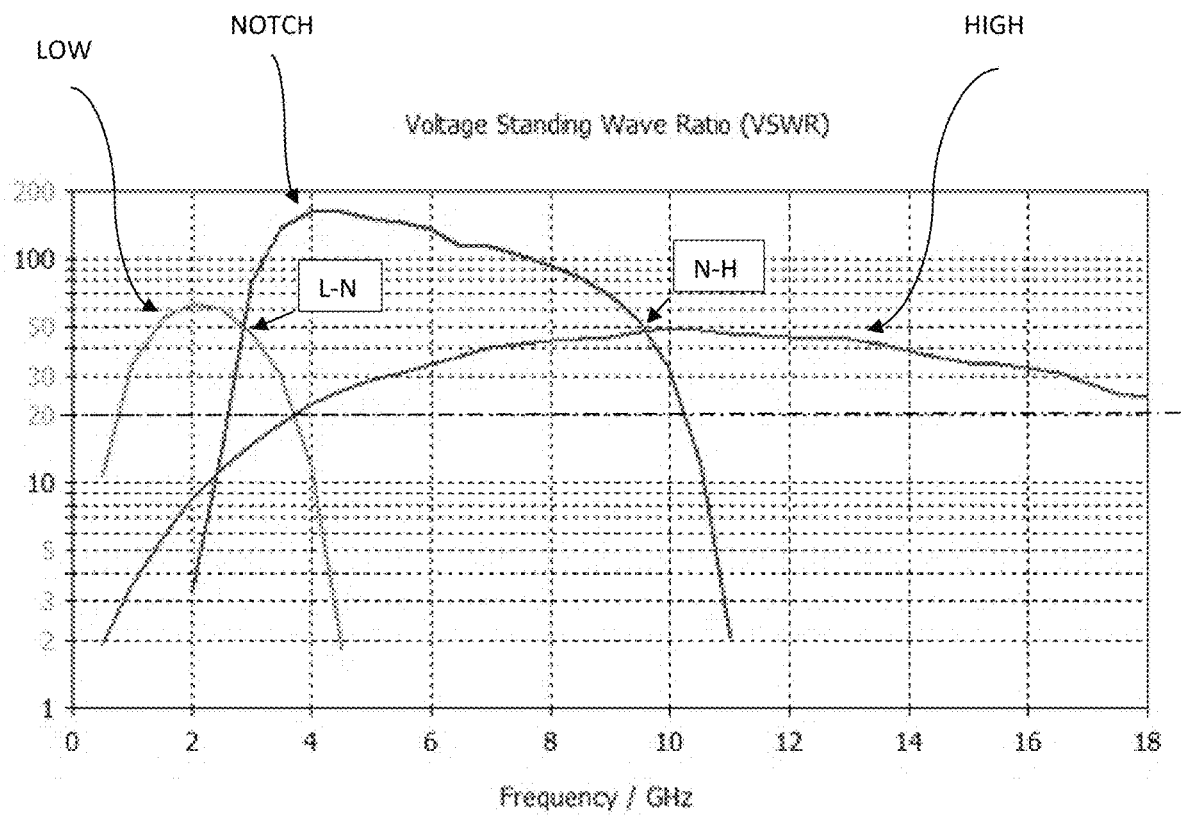

FIG. 12 depicts the wideband maximum Gamma response of the three tuning slug configurations.

DETAILED DESCRIPTION OF THE INVENTION

A typical slide screw tuner is shown in FIG. 2: it includes a slabline 24 with a center conductor 23, a test port 25 and an idle port 26. Inside the tuner housing 215 there is a mobile carriage 28 traveling 217 along the slabline, driven by a screw 29 and a stepper motor and gear 27 in form of a timing belt, a rack and pinion drive or else; in the carriage 28, there is a highly precision, zero-backlash vertical axis mechanism 21 moving towards and away 216 from the slabline and holding a capacitively coupled with the center conductor 23 tuning probe (slug) 22. The vertical axis mechanism 21 and the slug 22 are controlled by a second vertical stepper motor 20 which is also remotely controlled 20a. It is this type of traditional, proved, tuner technology this invention uses for the configurable combination tuning probe system.

The typical prior art tuning probe (slug) is shown in FIG. 3: it includes a body 34 and has a concave bottom matching the diameter of the cylindrical center conductor 33 of the slabline 31 and a holding pin 32 to be attached to the vertical axis mechanism 21. The slug moves vertically 36 and horizontally 35 controlled by the vertical axis 21 and the horizontally movable carriage 28. Vertically, the tuning probe moves between a top position T and a bottom position B leaving a small gap [S] for maximum capacitive coupling and to avoid a short circuit. The length 37 of the parallelepiped slug is defined along the axis of the slabline, the thickness of the slug is defined perpendicular to the axis of the slabline.

The new tuning probe system is shown in FIG. 4: it includes a saddle slug 40 attached using the pin 45 to the vertical axis mechanism 21 like the prior art slug 34 of FIG. 3; it also includes a core slug 43, which is used for reflecting the higher frequencies; the saddle slug 40 and the core slug 43 are sliding vertically seamlessly pre-loaded against each-other. The sliding is lockable at three vertically aligned positions BOTTOM-MEDIUM and TOP (FIG. 7). These positions are defined by three troughs cut into the inner side walls of the legs of the saddle slug; the core slug contains a set of two diametrically spring-loaded steel balls, incorporated in its body (FIG. 7), and protruding sidewise from the slug body; the steel balls hop and drop in from trough to trough as the core and saddle slugs, which are pre-loaded against each-other, slide vertically against each-other and cause secure locking the relative vertical position of the slug components. To control the relative vertical movement of the slugs, the core slug has on its front and back side two protruding horizontal parallel ridges a TOP RIDGE and a BOTTOM RIDGE (FIG. 6A); it is by moving the carriage 28 towards the fork 101 and placing the prongs 100, of the permanently 102 mounted fork 101 between the said two ridges and moving vertically the assembly (i.e. the saddle slug) while having the core slug immobilized by the two prongs, that we can shift and lock one slug component vertically against the other. The prongs have a pointed conical tip 104, in order to avoid catching at the entrance between the ridges. Herein the opening 103 between the two prongs is chosen to allow the legs of the saddle slug and the core slug to enter freely and quasi slide-fit between the prongs for secure control but not larger than the thickness of the slug plus the thickness of the ridges.

The tuning probe system and its modes of operation are shown in FIGS. 4A to 4D. FIG. 4A shows the overall picture relative to the center conductor of the slabline; FIG. 4B shows the high frequency operation mode, where the (shorter) core slug 43 is locked deeper than the legs of the saddle slug 40 and reflects the higher frequencies (trace B in FIG. 5) because the capacitance with the center conductor is smaller and the cut-off frequency higher; FIG. 4C shows the low frequency mode of operation, where both slug components are adjusted and aligned at equal distance from the center conductor, in which case their combined capacitance reaches a maximum and the frequency coverage is the lowest (trace C in FIG. 5); FIG. 4D shows the legs 41, 42 of the saddle slug 40 being lower than the withdrawn core slug 43; this is achieved by moving the assembly as low as necessary for the prongs of the fork which hold the core slug to cause the steel balls to hop and drop into the top trough and lock the core slug higher than the saddle slug; the "notch" operation creates a narrower response but, since the first slug acts as a pre-match to the second slug, with a much higher local reflection actor as shown by trace D; typical height difference 80 (FIG. 8) between the troughs, to ensure enough de-coupling of either elevated slug component is approximately 1.5-2 diameters of the center conductor.

The locking mechanism is visualized in a cross section of the tuning probe assembly in FIGS. 7, 8 and 9: we can see the saddle slug 70 and the core slug 71. We can also see the three troughs spaced vertically 80 by a distance that allows the combinations of the slug components to operate efficiently, i.e., if one slug is closest to the center conductor to create maximum reflection, the withdrawn slug is "invisible', meaning its own reflection is negligible. This distance depends on the overall size of the components and is roughly 1.5 to 2 times the diameter of the center conductor. The locking works when one slug slides vertically pre-loaded against the other and the steel balls, pushed by the spring, hop, drop and lock in one set of opposite troughs; between the troughs there is a shallow vertical groove (GUIDE) that leads the balls vertically between the troughs and keeps the slugs aligned.

The procedure for switching between tuning probe states is shown in the flowchart of FIG. 11: in a first step the carriage 28 is moved towards the tuner port having the fork 101 permanently installed. Then the vertical position is arranged for the fork to slip between the top and bottom ridges (FIG. 6A, 6B in view of FIG. 10) and, depending on the actual state of the tuning probe assembly: A) if we want to lower the core slug towards high frequency mode, we must lift the saddle slug 40; if, now, we want to lift the core slug towards low frequency mode, we must lower the saddle slug one step and, from here, to move to the high Gamma notch mode we must lower the saddle slug further to the second step. Reliable switching between tuning modes is secured with pre-loaded steel balls inserted across the core slug (FIG. 7), guided vertically using a vertical guiding channel on the internal sidewalls of the legs of the saddle slug and popping into preset throughs along the inner walls of the legs of the saddle slug There are three secured settings, a top lock (notch slug) a middle lock (low frequency slug) and a bottom lock (high frequency slug) possible.

Since the configurable tuning probe system of the present invention is controlled, for every single frequency, in the corresponding tuning mode, using a single horizontal and vertical control, the calibration of the tuner follows prior art (see ref. 7); if the frequencies to be calibrated are covered by different tuning modes, prior definition of the boundaries between frequency bands, as indicated in FIG. 12, will initiate the slug configuration procedure per flow chart of FIG. 11 at frequency L-N (low-to-notch) and N-H (notch-to-high) in order to obtain the maximum tuning range for each frequency.

The present invention discloses a configurable tuning probe system for single vertical axis load pull tuners, allowing operation in three modes (states), whereby allowing widening the instantaneous frequency bandwidth and the tuning range of the tuner, without the need for additional electronic and remotely controlled mechanical gear. The slugs are mounted and controlled such as to create a longer, a shorter and a notch slug in one automatically reconfigurable assembly. Obvious alternatives shall not impede the originality of the idea.

What is claimed is:

1. A remotely configurable tuning probe system for load pull tuner comprising:
   a remotely configurable multi-slug tuning probe, and
   means for remotely configuring the multi-slug tuning probe;
   wherein
      the load pull tuner comprises, a slabline with two sidewalls, a center conductor, a control port, an idle port and at least one remotely controlled mobile carriage moving along the slabline and including one remotely controlled vertical axis mechanism, holding the configurable multi-slug tuning probe;
   and wherein
      the multi-slug tuning probe is insertable slide-fitting between the sidewalls of the slabline and includes two metallic slugs, a double saddle slug which has a top bar and two legs and is linked to the vertical axis mechanism, and a single core slug which slides vertically between the legs of the saddle slug,
   and wherein
      the slugs have a rectangular body with a thickness, a front, a back and two side walls and a bottom surface mirroring the center conductor;
   and wherein
      the means for remotely configuring the multi-slug tuning probe comprise:
         an unmovable control device linked to the slabline, and
         the core slug having studs protruding symmetrically from the front and the back wall, a top stud and a bottom stud on each wall and spaced vertically by a same gap, and
         an automated configuration procedure;
      and wherein
         the core slug and is lockable using a locking mechanism against the legs of the saddle slug at three positions, a bottom lock position, a medium lock position and a top lock position;
      and wherein
         at the top lock position, the core slug is withdrawn, at the medium lock position the two legs and the core slug are flash at their bottom surface, and at the bottom lock position the core slug protrudes between the two legs towards the center conductor.

2. The locking mechanism for the configurable multi-slug tuning probe of claim 1,
   wherein
      the core slug has a set of two spring-loaded steel balls aligned vertically and protruding horizontally from each of its side walls and each of the two legs of the saddle slug has three troughs on its side wall facing pairwise the steel balls of the core slug, a top trough, a medium trough, and a bottom trough,
   and wherein
      as the core slug slides vertically against the saddle slug, the spring-loaded steel balls roll vertically along the side walls of the legs until they drop and fit snuggly into the troughs.

3. The control device of the means for remotely configuring the multi-slug tuning probe of claim 1 having the form of a fork, linked to the slabline at the control port, and having two parallel horizontal prongs,
   wherein
      the prongs have conical tips and a vertical thickness less than the gap between the studs and an opening between them at least as the thickness of the slugs and less than the thickness of the slugs plus the protrusion of the studs from the front and the back wall of the core slug.

4. The automated configuration procedure of the means for remotely configuring the multi-slug tuning probe of claim 1 or 3 comprising the following steps:
   a) move the carriage close to the control port and adjust the vertical position of the multi-slug tuning probe for the prongs to be aligned with and insertable between the studs of the core slug;
   b) move the carriage to insert the prongs between the studs;
   c) from the medium lock position:
      lift the vertical axis to switch to the low lock position, or
      lower the vertical axis to switch to the top lock position;
   d) from the top lock position:
      lift the vertical axis by one step to switch to the medium lock position, and by two steps to switch to the low lock position;
   e) from the low lock position:
      lower the vertical axis by one step to switch to the medium lock position, and by two steps to switch to the top lock position;
   f) move the carriage outside of the reach of the prongs.

5. The multi-slug tuning probe of claim 1,
   wherein
      the slugs have various horizontal lengths.

6. The multi-slug tuning probe of claim 1,
   wherein
      while moving vertically and horizontally the slugs are locked on each-other sidewise.

7. The multi-slug tuning probe of claim 1,
   wherein
      the slugs have the same horizontal length.

8. The configurable tuning probe system of claim 1,
   wherein the mobile carriage of the slide screw load pull tuner and the vertical axis mechanism are remotely controlled using stepper motors and gear.

\* \* \* \* \*